April 24, 1934.  T. J. MOSHER  1,956,158
COUNTERBALANCE
Filed March 18, 1933   2 Sheets-Sheet 1
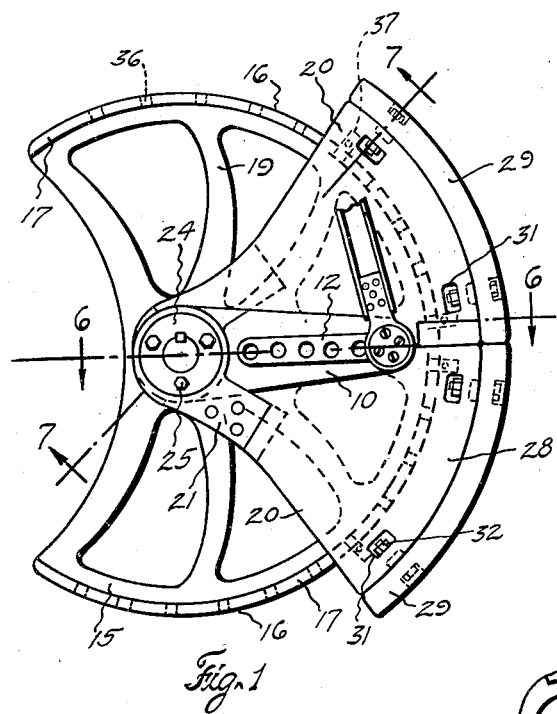
Fig. 1
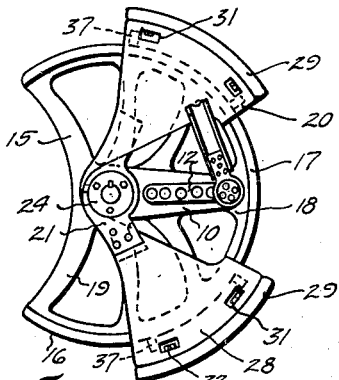
Fig. 9
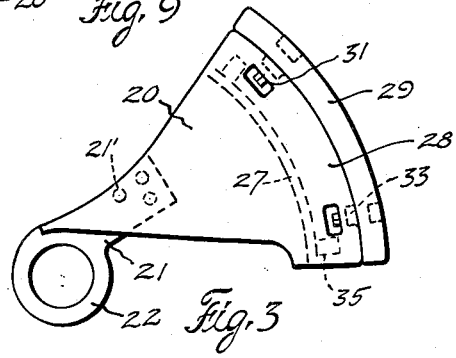
Fig. 3
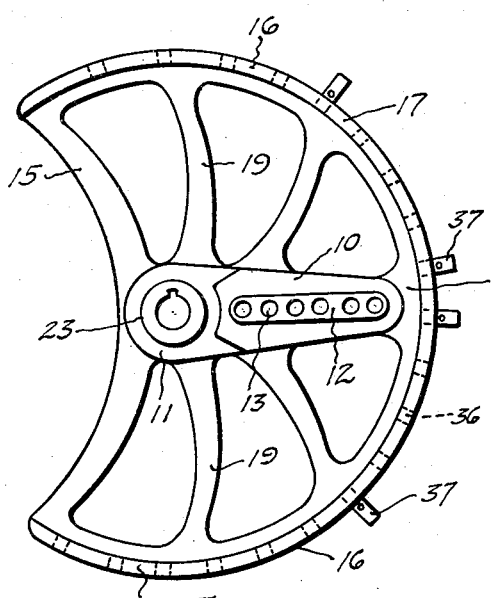
Fig. 2
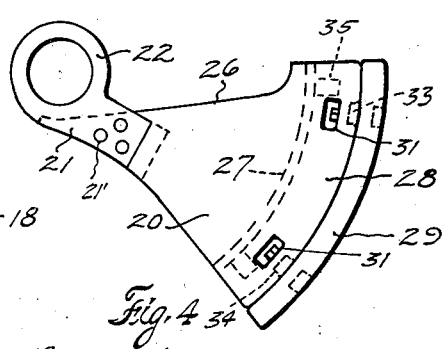
Fig. 4
Fig. 5
Inventor
Theodore J. Mosher
By Jack A. Athley
Attorney April 24, 1934.  T. J. MOSHER  1,956,158
COUNTERBALANCE
Filed March 18, 1933   2 Sheets-Sheet 2

Inventor
Theodore J. Mosher
By Jack A. Ashley
Attorney

Patented Apr. 24, 1934

1,956,158

UNITED STATES PATENT OFFICE 1,956,158

COUNTERBALANCE

Theodore J. Mosher, Dallas, Tex.

Application March 18, 1933, Serial No. 661,495

9 Claims. (Cl. 74—71)

This invention relates to new and useful improvements in counterbalances.

One object of the invention is to provide a crank with a pair of counterweights, both of which are adjustable and mounted in an improved manner; whereby they may be more readily adjusted about the axial center of the shaft so as to assist the crank in counterbalancing loads periodically applied.

A further object of the invention is to provide a crank and counterweights, together with an arcuate supporting member integral with the crank and arranged with guides for the weights; whereby said weights are sustained in all adjusted positions and the labor in adjusting said weights is reduced to a minimum.

Another object of the invention is to provide a mounting for the weights, whereby the crank and weight-support may be given an integral and substantial hub and the weights pivoted in said hub, so that the radial thrust of the weights is taken by both the hub and the support, and thus distributed.

Still another object of the invention is to provide counterweights which, while pivoted to the hub of the crank, do not depend upon such pivoting or mounting to attach them to the crank or to carry them.

A construction designed to carry out the invention will be hereinafter described, together with other features of the invention.

Figure 6:
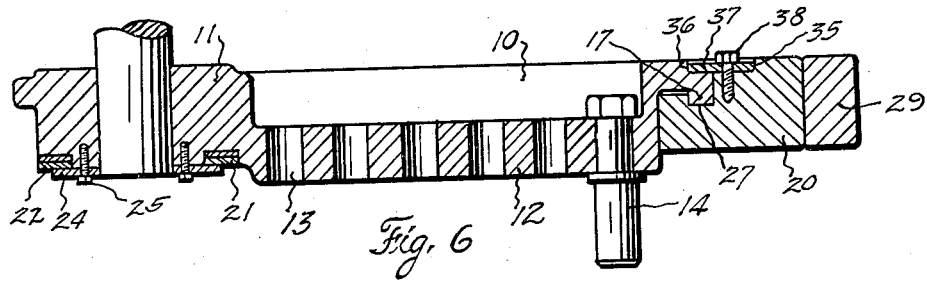
Figure 7:
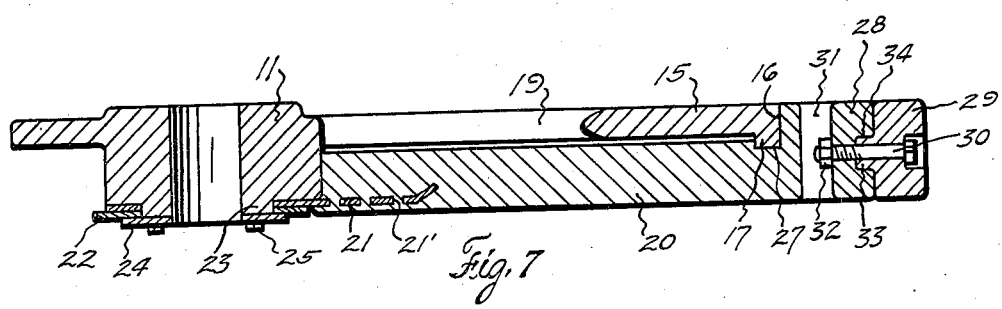
Figure 8:
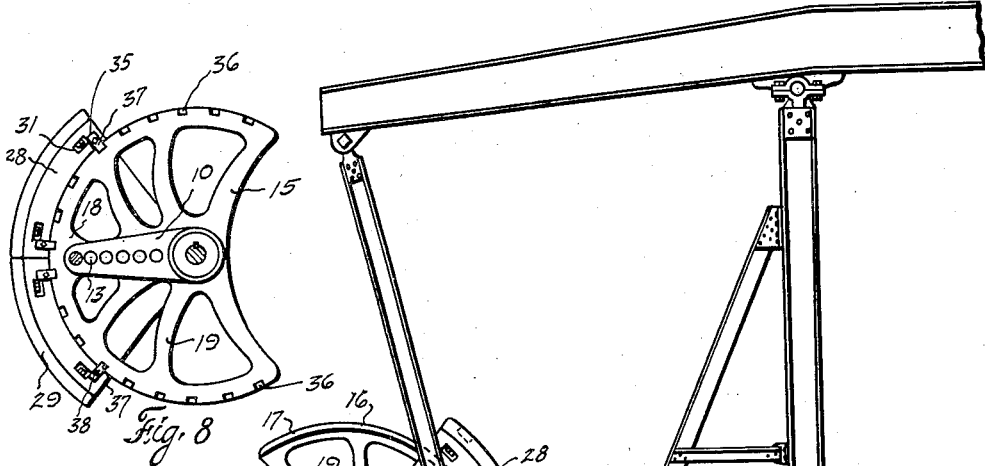
Figure 10:
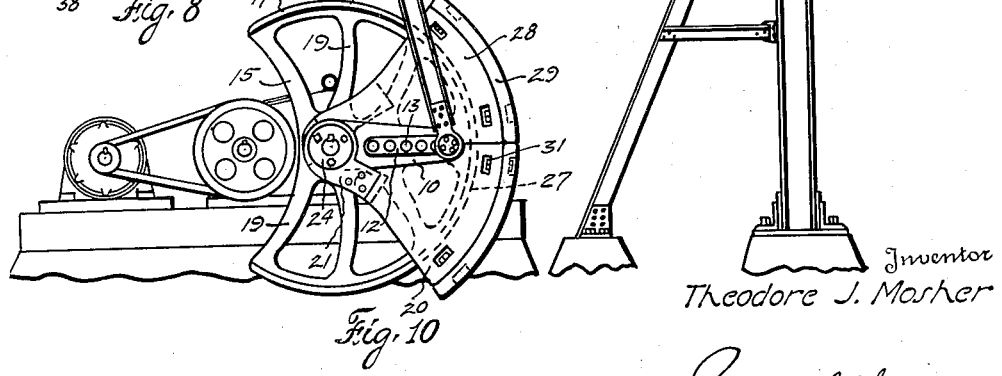

The invention will be more readily understood from a reading of the following specification and by reference to the accompanying drawings in which an example of the invention is shown, and wherein:

Figure 1 is a side elevation of a counterbalance constructed in accordance with the invention, Figure 2 is a side elevation of the crank member, Figures 3 and 4 are front elevations of the counterweights, Figure 5 is a side view of one of the counterweights, Figure 6 is an enlarged diametrical cross-sectional view taken on the line 6—6 of Figure 1, Figure 7 is an enlarged diametrical cross-sectional view taken on the line 7—7 of Figure 1, Figure 8 is a reduced elevation of the side opposite to that shown in Figure 1, Figure 9 is a reduced side elevation similar to Figure 1, showing the counterweights moved to another adjustment, and Figure 10 is a view, in elevation of a portion of an oil well pumping rig.

In the drawings the numeral 10 designates a crank arm having a hub 11 offset from its inner end. The crank arm has a reduced pin boss 12 extending radially thereof and projecting from the side or face of the crank arm. This boss has spaced holes 13 for receiving the crank pin 14, in the usual manner. As is shown in Figure 6, the crank arm is hollowed out under the boss 12 so as to reduce the thickness of said boss, as well as to house the head of the crank pin.

The crank arm is made integral with and extends radially of a concentric weight support 15. This support extends equal distances on each side of the arm and has an arcuate guide rim or flange 16 at its outer edge concentric to the hub 11. This rim has an arcuate rib 17 on the same side as the crank arm and flush with its arcuate face. The rim is continuous and attached to the outer end of the arm by a web 18 and to the hub by spokes 19. The support is the equivalent of an ordinary fly wheel with substantially a quadrant omitted. Those portions of the support which lie on each side of the crank arm constitute wings.

Complementary sector-shaped weights 20 are mounted on the support 15 and have retaining plates 21 for rotatable mounting on the hub. Each plate has an enlarged head or ring 22 engaging on a reduced boss 23 surrounding the bore of the hub on one end of the latter, as is shown in Figures 2, 6 and 7. The rings lie one upon the other and their combined thickness is substantially equal to the length of the boss 23, so that a cap 24 fastened on the hub by machine screws 25 and overhanging said rings will hold them in place.

Each weight 20 has a recess 26 in one side shaped to receive and lie along one side and overhang the end of the crank arm 10, so as to embrace said arm and abut at their outer ends beyond said arm, as is shown in Figures 1, 8 and 10. The arm and the weights are substantially flush. Each weight has a concentric groove 27 receiving the guide rib 17 (Figures 6 and 7) and an arcuate rim 28 overhanging the face of the rim 16.

It will be apparent that each weight may be swung on the support 15 in the arc of a circle having its center coincident with the center of the hub, as will be obvious from an observation of Figures 1 and 9. The weights are carried by the support and the radial thrust is sustained by both the hub boss 23 and the rib 17. Arcuate weights 29 are fastened on the outer faces of the rims 28 by countersunk bolts 30 projecting into transverse slots 31 for receiving nuts 32, whereby said bolts are fastened. The bolts also pass through lugs 33 on the weights seated in recesses 34 in the rims 28, whereby the weights are held against circumferential and lateral displacement.

Referring again to the plates 21, it is pointed out that it is preferable to make these of heavy sheet steel or other suitable metal; while the counterweights 20 are made of cast iron or other cast metal. The plates have perforations 21' and are molded in the counterweights as is shown, one being located relatively further within its counterweight, so as to overlie the other when their rings 22 are mounted on the boss 23, as is shown in Figures 6 and 7. For fastening the counterweights in adjusted positions, the rear faces of their rims 28 are provided near each side with sumps 35 located to register with complementary sumps 36 in the rear face of the rim 16 of the support 15. These sumps 35 may be spaced as desired. Keepers 37 fastened in the sumps 35 by machine screws 38, engage in the sumps 36, thus holding the counterweights in position.

When it is desired to adjust the counterweights 20, the keepers 37 are removed. This permits the weights to be moved along the guide rim 16 and its rib 17 and rotated on the hub boss 23. The support 15 and its rim provide a substantial guide and the weights 20 are readily swung to the desired points (Figures 1 and 9). The weights being carried by the support, reduce the labor and danger incident to adjustment. While a pumping rig has been shown in Figure 10, it is not believed necessary to describe the same. The parts are connected in the usual way. In Figure 1 the counterweights are swung together and against the crank arm 10, and in this position exert their maximum counterbalancing effect. In Figure 9 the counterweights are adjusted to an intermediate position, thus effectiveness as a counterbalance being reduced. By adjusting the weights to the ends of the support 15, where they will balance each other, a fly wheel arrangement is obtained. One of the important features of the invention is the guide support which overlies the counterweights to a major extent, not only making adjustment more easy, but more efficiently supporting the latter against radial, circumferential and lateral strains.

The description which has been given recites more or less detail of a particular embodiment of the invention, which is set forth as new and useful; however, I desire it understood that the invention is not limited to such exact details of construction, because it is manifest that changes and modifications may be made within the scope of the appended claims, without departing from the spirit of the invention.

What I claim and desire to secure by Letters Patent, is:

1. A counterbalance comprising, a support, a crank arm extending radially of the support and attached thereto, a hub connected to the inner end of the arm and support, an arcuate guide on the outer portion of the support beyond the arm, counterweights pivoted on said hub and movably mounted on the support and guide on each side of said arm, and means for fastening said weights in adjusted positions.

2. A counterbalance comprising, a support, a crank arm extending radially of the support and attached thereto, a hub connected to the inner end of the arm and support, an arcuate guide on the outer portion of the support beyond the arm, counterweights pivoted on said hub and movably mounted on the support and guide on each side of said arm, means for fastening said weights in adjusted positions, and arcuate weights removably mounted on the outer portions of the counterweights.

3. A counterbalance comprising, a support having a hub, a crank arm integral with one side of the support and extending radially thereof from said hub, a guide on the support concentric to the hub, and counterweights overlying the support on each side of the arm rotatably engaging the hub and guide, said weights having recesses receiving said arm and abutting beyond the outer end of said arm.

4. A counterbalance comprising, a hub, a concentric support integral with said hub, a rim on the outer portion of the support having a lateral rib concentric to the hub, a radial crank arm on one side of the support between the hub and rim, and counterweights rotatably connected to the hub at their inner ends and provided with grooves receiving said rib, whereby the radial thrust of said weights is sustained by both the hub and the rib.

5. A counterbalance comprising, a hub, a concentric support integral with said hub, a rim on the outer portion of the support having a lateral rib concentric to the hub, a radial crank arm on one side of the support between the hub and rim, counterweights rotatably connected to the hub at their inner ends and provided with grooves receiving said rib, whereby the radial thrust of said weights is sustained by both the hub and the rib, and fastening means engaging the weights and the rim.

6. A counterbalance comprising, a hub having a reduced boss, a concentric support extending radially from the hub, an arcuate guide rib on the outer portion of the support, a crank arm extending radially from the hub along one side of the support, said support being disposed substantially equally on each side of said arm, sector-shaped counterweights mounted on the support and having arcuate grooves receiving the rib and overhanging said support, and plates fastened to the weights and rotatably mounted on the boss of said hub.

7. A counterbalance comprising, a hub having a reduced boss, a concentric support extending radially from the hub, an arcuate guide rib on the outer portion of the support, a crank arm extending radially from the hub along one side of the support, said support being disposed substantially equally on each side of said arm, sector-shaped counterweights mounted on the support and having arcuate grooves receiving the rib and overhanging said support, plates fastened to the weights and rotatably mounted on the boss of said hub, the support having spaced sumps, and keepers carried by the weights and engaging in the sumps of the support for fastening the weights in adjusted positions.

8. A counterbalance comprising, a crank arm, wings on each side of said arm, arcuate guides on the outer margins of said wings, a hub from which the wings extend, counterweights overlapping the wings between the hub and the guides and having guide portions engaging the guides, means for pivotally connecting the inner ends of said weights with the hub, and means for fastening said weights in position.

9. A counterbalance comprising, a hub, a crank arm extending radially from the hub, an arcuate support extending from the hub on each side of the crank arm and having an arcuate guide on its outer margin extending on each side of the arm, counterweights movable on the guide, said weights having elongated members extending inwardly from the guides on each side of the crank arm and overlying the sides of the support, means for fastening the weights in position on the guide, and retaining means at the inner ends of the weight members, the weights extending beyond the arm and having their inwardly extending members recessed to receive said crank arm, whereby the weights may be brought together beyond the outer end of the arm.

THEODORE J. MOSHER.